G. ATTERBURY.
REINFORCED CELLULAR STRUCTURE.
APPLICATION FILED APR. 16, 1918.

1,349,868.

Patented Aug. 17, 1920.
2 SHEETS—SHEET 1.

INVENTOR
Grosvenor Atterbury
BY
Sheffield Betts
ATTORNEYS.

G. ATTERBURY.
REINFORCED CELLULAR STRUCTURE.
APPLICATION FILED APR. 16, 1918.
1,349,868.
Patented Aug. 17, 1920.
2 SHEETS—SHEET 2.
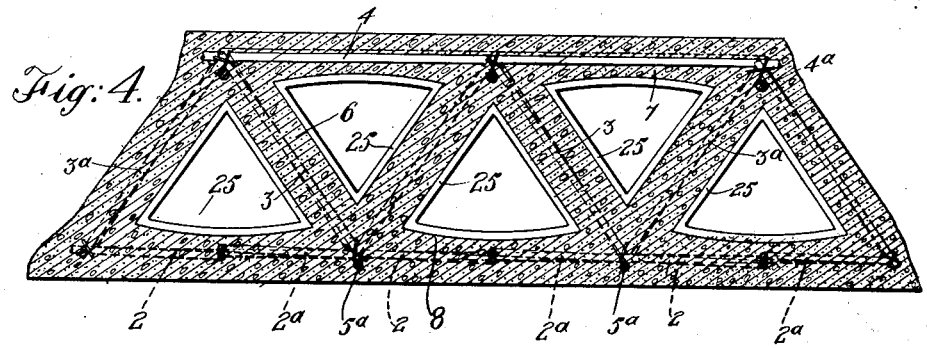
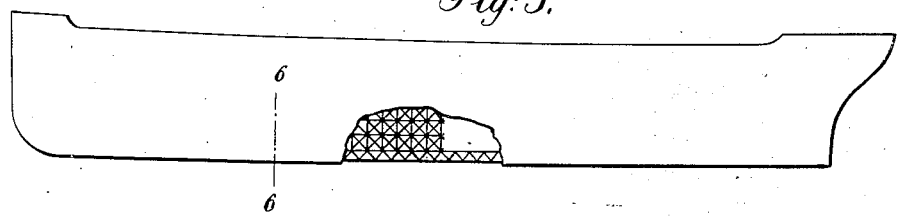
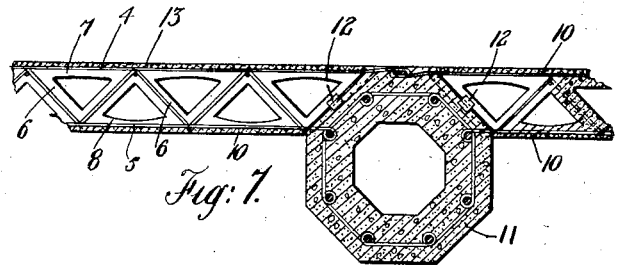
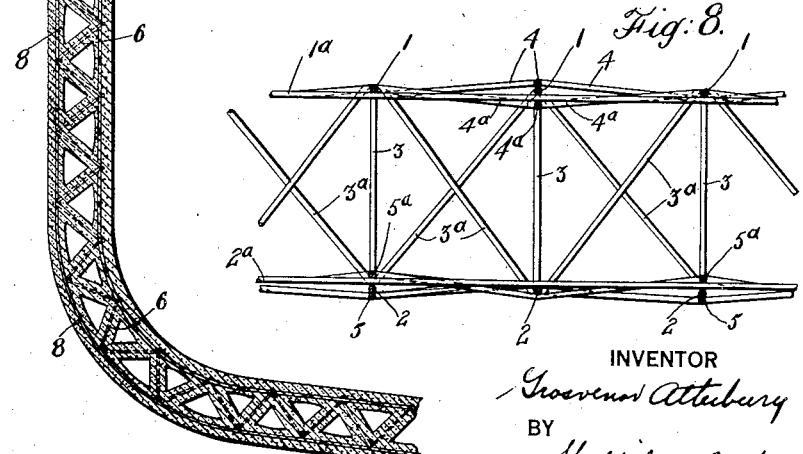
INVENTOR
Grosvenor Atterbury
BY
Sheffield Betts
ATTORNEYS

UNITED STATES PATENT OFFICE.

GROSVENOR ATTERBURY, OF NEW YORK, N. Y.

REINFORCED CELLULAR STRUCTURE.

1,349,868.   Specification of Letters Patent.   Patented Aug. 17, 1920.

Application filed April 16, 1918. Serial No. 228,873.

*To all whom it may concern:*

Be it known that I, GROSVENOR ATTERBURY, a citizen of the United States, and a resident of the borough of Manhattan, city, county, and State of New York, have invented certain new and useful Improvements in Reinforced Cellular Structures, of which the following is a description.

My invention relates to the class of structures in which a reinforcement of a material having high tensile strength is embedded in a mass or structure of cementitious material to form a unitary structure in which the properties of the material in the reinforcement supplement those of the other material.

Certain of the objects of my invention are as follows:

To provide a structure of the class mentioned in which the reinforcement is so disposed as to offer a maximum resistance in proportion to its weight to both perpendicular and inclined stresses to which the structure may be subjected;

To provide a structure in which a uniform stress or blow is immediately transmitted from the point of application to the opposite side of the structure and thence distributed over the entire structure;

To provide a structure which is of a minimum total weight in proportion to its strength;

To provide a structure in which the reinforcement is not only so disposed as to act with maximum efficiency in resisting stresses perpendicular to an outer surface, but which is also inherently cross-braced;

To provide a cellular structure of reinforced cementitious material, having the maximum possible ratio of void to solid consistent with the required structural strength, and which is therefore especially adapted for use in ship or barge construction, although adapted also to a wide range of other uses;

And to provide a structure of high strength and general utility which may be readily constructed in factories or yards on the unit principle.

Further objects of my invention will appear to those skilled in the art from the following description:

Having the foregoing objects in view, the preferred embodiment of my invention comprises a cementitious block or slab having front and rear walls connected by webs which webs, instead of being disposed perpendicular to the front and rear walls as has heretofore been customary, are inclined alternately in opposite directions so that the ends of the webs abut or join each other. A reinforcing skeleton frame of steel is incorporated in the block or slab at the time of casting and is so constructed and disposed as to form two sets of trusses lying in planes perpendicular to the outer surfaces of the structure, the trusses in each set being parallel and the planes of the trusses in one set intersecting the planes of the trusses in the other set at right angles. In addition to the chord members which enter into the two sets of trusses just mentioned, I provide two additional sets of chord members which cross each other at right angles and which form angles of 45° with the first-mentioned chord members. These second-mentioned chord members form with the struts of the first-mentioned trusses other trusses whose planes are inclined to the outer surfaces of the structure. The entire arrangement of chord and strut members forms a series of tetrahedrons arranged in rows, each two tetrahedrons being separated by pentahedrons. The bases of the pentahedrons are square and may be cross-braced by two diagonals which also form the chord members of the first-mentioned sets of trusses. The chord members forming the square bases of the pentahedrons also form with the strut members of the perpendicular trusses a series of inclined trusses, while the strut members which define the inclined edges of one of the pentahedrons also define edges of adjacent pentahedrons and tetrahedrons. The pentahedrons also form rows, the pentahedrons of one row having their bases in the opposite outer surface of the reinforcement from those in the two adjacent rows.

In the drawing which accompanies and forms a part of this specification, Figure 1 is a perspective view of a portion of the reinforcement used in my improved structure without the cementitious material.

Fig. 4 is a sectional view of a portion of a cellular structure according to my invention before the removal of the cores used in casting, the parts being shown as if the observer were looking at right angles to the line 4—4 of Fig. 2.

Fig. 5 is an elevational view showing my invention as applied to the hull of a ship or barge.

Fig. 6 is a sectional view taken on a line 6—6 of Fig. 5.

Fig. 7 is a sectional view showing a portion of two slabs embodying my invention and combined with a skeleton frame member which might serve as one of the ribs of a barge.

Fig. 8 is a cross-section taken on a line 8—8 of Fig. 2.

Figure 1:
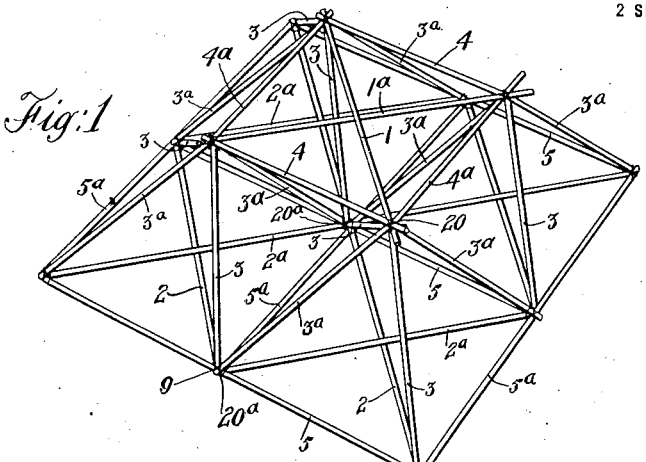

Referring more particularly to the drawing, 1—1 and $1^a$—$1^a$ are two sets of chord members in the outer surface of my preferred form of reinforcement, the members of each set being parallel and crossing the chords of the other set substantially at right angles. In the opposite surface of the reinforcement are two sets of chord members 2—2 and $2^a$—$2^a$ respectively, which lie immediately below 1—1 and $1^a$—$1^a$ when the reinforcement is viewed as in Fig. 2. Coöperating with chord members 1 and 2 are inclined struts, such as 3, which form with members 1 and 2 a set of perpendicular trusses, while coöperating with chord members $1^a$ and $2^a$ is a second set of inclined struts, such as $3^a$, which form the members $1^a$ and $2^a$ a second set of perpendicular trusses extending at right angles to the first-mentioned set of trusses. In addition to the chord members 1 and $1^a$ in the outer surface of the reinforcement I provide two additional sets of chord members, such as 4 and $4^a$, which connect certain points of intersection of the members 1 and $1^a$, the members 4 extending at right angles to the members $4^a$ and forming squares therewith, the members 1 and $1^a$ forming diagonals of the said squares. Where the chords 4 and $4^a$ intersect, there is also an intersection of the members 1 and $1^a$ forming a major intersection such as is indicated at 20, but it will be seen that the members 1 and $1^a$ are spaced closer than members 4 and $4^a$ so that not every intersection of chords 1 and $1^a$ is a major intersection, such as has just been mentioned. In the lower surface of the reinforcement as viewed in Figs. 1 and 2, I also provide chord members in addition to members 2 and $2^a$, such additional chord members being designated as 5 and $5^a$ respectively, and being parallel to 4 and $4^a$. The points where chord members 5 and $5^a$ intersect members 2 and $2^a$ are also major points of intersection which are designated $20^a$. It will be seen, however, that members 5 are staggered as respects members 4, and members $5^a$ are staggered as respects $4^a$, so that the points of major intersection 20 in one surface of the reinforcement are staggered with respect to the points $20^a$ in the opposite surface. Moreover, it will be seen that the inclined strut members 3 and $3^a$ connect points of major intersection in one plane or face of the reinforcement with points of major intersection in the opposite face of the reinforcement. As will be seen from Fig. 1, the strut members define the inclined edges of pyramids of pentahedrons whose bases are in the surfaces of the reinforcement, and the said pentahedrons are separated by tetrahedrons. For instance, a tetrahedron may be readily distinguished in Fig. 1 as defined by members 4, $3^a$, 3, $3^a$, 3 and $5^a$, one of whose vertices is at $20^a$. At the points of major intersection, such as 20 and $20^a$, I have shown tie wires, such as 9, by which the chord members and strut members are secured together. However, it will be understood that other means of securing these members together may be adopted at will.

Figure 2:
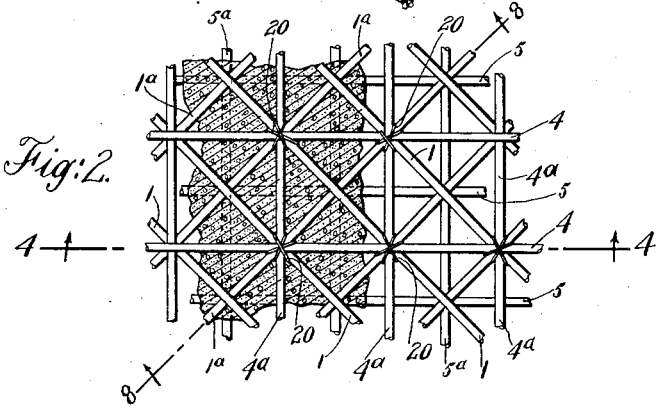
Fig. 2 is a top plan view of a reinforcement similar to that shown in Fig. 1, but illustrating a larger section of the same.
Figure 3:
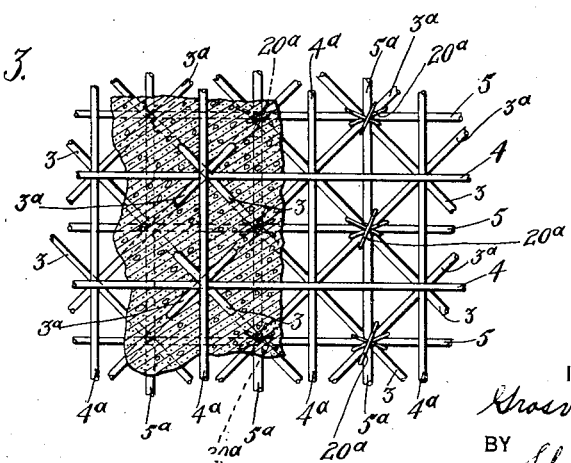
Fig. 3 is a top plan view of a portion of my reinforcement from which certain of the chord members have been removed for purposes of illustration, the structure in Fig. 3 being otherwise similar to that in Figs. 1 and 2.

When the reinforcement shown in Figs. 1, 2 and 3, is viewed from a direction at right angles to the members $5^a$, or at right angles to the members 5, a series of apertures of triangular cross-section will be seen to extend through the reinforcement, such apertures being indicated in Fig. 4. Consequently, in order to provide a relatively light, strong, cellular structure, I have found it convenient when casting the cementitious material around the reinforcement to use cores, such as 25, of triangular cross-section so arranged within the reinforcement as to leave spaces for inclined webs or walls, such as 6, in which all the strut members are embedded, the chord members being also embedded in outer walls, such as 7 and 8 respectively, the cores being preferably removed when the cast material has set, thus forming apertures of triangular cross-section in the resulting structure. In order to secure maximum strength with minimum weight, the sides of the cores 21 are arch-shaped so as to give an arch shape to the sections of the outer and inner walls which lie between the edges of the inclined webs 6. By this arrangement, only the concrete or cement-like material which is actually required in bracing the reinforcing members and in resisting blows and stresses is retained, while the efficiency both of the cementitious material and of the reinforcing material is increased.

In Figs. 5 and 6, I have shown my cellular reinforced structure as applied to the hull of a ship or barge, the hull of the vessel being indicated as of monolithic construction. By means of this design I may also make the voids in my cellular structure sufficiently large in proportion to the solids so that the unit weight of the structure shall be less than that of water. Consequently, an unloaded hull made according to my invention will float even though filled with water.

In Fig. 7, however, I have illustrated the use of my reinforced structure according to the unit principle, having shown in said figure two slabs, such as 10, embodying my invention, the edges of said slabs contacting with a tubular skeleton frame member, such as 11, of octagonal cross-section, which may serve as the rib of a ship or barge, or other structural member as desired. At the surfaces where plates 10 contact with the member 11, I provide registering grooves or channels, such as 12, which may be filled with any suitable material adapted to expand on contact with water and form a water-tight joint.

It will be seen, moreover, by providing triangular apertures through the cementitious material that the inclined webs or walls not only serve to support and brace the struts of the reinforcement, but themselves act as struts forming with the outer shells or walls trusses running in directions at right angles to the longitudinal axes of the triangular apertures.

In cases where the stress may be applied to the structure from either side, as in a steamer, it is necessary that the chord members be used in both the outer and the inner shell, but if the stress is applied in one direction only, as in case of a barge, the chord members in one shell may be omitted. Also in some cases the chord members 1 and 1ᵃ may be omitted, since the members 4 and 4ᵃ, acting with the cementitious material, may be relied on to take up the strains carried by said members 1 and 1ᵃ.

It will be understood, also, that I do not limit myself to a cellular structure, but consider as within the scope of my invention the use of a reinforcement according to my ideas in a solid slab instead of a cellular structure.

While I have described my improved reinforced structure particularly with reference to its use in building ships or barges, it will be understood that it may be applied to a variety of uses, such as roofs, floors, walls and footings for columns.

Having thus described my invention, I claim:

1. The combination with a cellular structure of cementitious material of a reinforcement therefor and embedded therein, said structure having substantially parallel outer walls and inclined portions forming with said outer walls apertures of triangular cross section, said reinforcement comprising a set of chord members in one of said outer walls, said set comprising parallel members crossing other parallel members and strut members running from one of said outer walls to the other and lying within said inclined walls, said last mentioned members forming with said chord members pentagons whose bases are in one of said outer walls and whose apices are in the other of said outer walls.

2. The combination with a cellular structure of cementitious material of a reinforcement therefor and embedded therein, said structure having substantially parallel outer walls and inclined portions forming with said outer walls apertures of triangular cross section, said reinforcement comprising a set of chord members in one of said outer walls, said set comprising parallel members crossing other parallel members and strut members running from one of said outer walls to the other and lying within said inclined walls, said last mentioned members forming with said chord members pentagons whose bases are in one of said outer walls and whose apices are in the other of said outer walls, and an additional set of chord members connecting alternate corners in the bases of said pentagons.

3. The combination with a cellular structure of cementitious material of a reinforcement therefor and embedded therein, said structure having substantially parallel outer walls and inclined portions forming with said outer walls apertures of triangular cross section, said reinforcement comprising a set of chord members in one of said outer walls, said set comprising parallel members crossing other parallel members and strut members running from one of said outer walls to the other and lying within said inclined walls, said last mentioned members forming with said chord members pentagons whose bases are in one of said outer walls and whose apices are in the other of said outer walls, and chord members in the other of said outer walls connecting the apices of said first mentioned pentagons and forming therewith a second set of pentagons whose bases are in said second mentioned outer wall and whose apices are in said first mentioned outer wall, the members of said reinforcement forming also tetrahedrons.

4. A reinforcement for cementitious material comprising chord members arranged in parallel planes, and strut members forming with said chord members a system of individually strutted intersecting trusses, the individual trusses of said system lying in planes perpendicular to the planes determined by said chord members.

5. A reinforcement for cementitious material comprising a set of parallel trusses, said trusses having chord members and strut members and chord members in addition to the chords of said trusses, said second chord members forming with said strut members an additional set of trusses, said strut members lying in the planes of both said sets of trusses, the planes of said two sets of trusses intersecting the planes of said chord members at different angles and intersecting each other at other than right angles.

6. A reinforcement for cementitious material comprising a set of spaced parallel trusses, a second set of spaced parallel trusses intersecting said first set, and chord members in addition to those of said trusses connecting certain points of intersection of the said sets of trusses.

7. A reinforcement for cementitious material comprising a set of individually strutted spaced parallel trusses and a second set of individually strutted spaced parallel trusses, one set of said trusses crossing the other set at right angles.

8. A reinforcement for cementitious material comprising a set of spaced parallel trusses, a second set of spaced parallel trusses, the trusses of one set crossing those of the other at right angles, and chord members in addition to those of said trusses connecting certain points of intersection of said trusses to form squares.

9. The combination of a cellular cementitious structure having reinforcing material therein, said structure having parallel apertures of triangular cross-section therethrough, and reinforcing trusses whose strut members are embedded in the transverse walls of said structure, the planes of said walls cutting the planes of said trusses at other than right angles.

10. A reinforcement for cementitious material comprising two sets of trusses arranged in planes perpendicular to the outer faces of the reinforcement, the planes of one set of said trusses intersecting those of the other set, and chord members in addition to those of said trusses connecting certain of the points of intersection of the trusses, said last-mentioned chord members forming inclined trusses with the struts of one set of said first-mentioned trusses.

11. A reinforcement for cementitious material comprising a set of parallel trusses arranged in planes perpendicular to the outer faces of the reinforcement, and chord members in addition to the chords of said trusses forming inclined trusses with the struts of said first-mentioned trusses.

12. A reinforcement for cementitious material comprising two sets of trusses arranged in planes perpendicular to the outer faces of the reinforcement, the planes of one set of said trusses intersecting those of the other set, and chord members in addition to those of said trusses connecting certain points of intersection of said trusses, said last-mentioned chord members forming inclined trusses with the struts of both sets of said first-mentioned trusses.

13. The combination of a cellular cementitious structure having reinforcing material therein, said structure having parallel apertures of substantially triangular cross-section therethrough, and a set of reinforcing trusses arranged in planes perpendicular to the outer faces of the structure, the inclined walls separating said apertures cutting the planes of said trusses at other than right angles, and the strut members of said trusses lying entirely within said inclined walls.

14. The combination with a cellular slab of reinforced cementitious material of reinforcement in said slab having strut members therein in planes inclined to the outer surface and the slab having an inclined outer edge substantially parallel to one of said inclined planes determined by said struts.

15. A reinforcement for cementitious material having two substantially parallel surfaces comprising members arranged to form pyramids having square bases in the outer surfaces of the reinforcement.

16. A reinforcement for cementitious material having two substantially parallel surfaces and comprising members arranged to form pyramids having square bases in said surfaces and having members forming diagonals of said square bases.

17. A reinforcement for cementitious material comprising chord members arranged in parallel planes, and strut members forming with said chord members a system of intersecting trusses, the individual trusses of said system lying in planes perpendicular to the planes determined by said chord members and the struts of one truss being exterior to any other truss.

18. A reinforcement for cementitious material having two substantially parallel surfaces comprising members arranged to form right pyramids having square bases in the outer surfaces of the reinforcement.

19. A reinforcement for cementitious material having two substantially parallel surfaces and comprising members arranged to form right pyramids having square bases in said surfaces and having members forming diagonals of said square bases.

20. A reinforcement for cementitious material comprising two sets of trusses arranged in planes perpendicular to the outer faces of the reinforcement, the planes of one set of said trusses intersecting those of the other set and chord members in addition to those of said trusses, said last mentioned chord members intersecting the struts of said trusses and forming trusses therewith which incline to the outer faces of the reinforcements.

GROSVENOR ATTERBURY.